United States Patent
Uriu et al.

(10) Patent No.: US 6,510,165 B1
(45) Date of Patent: *Jan. 21, 2003

(54) BAND CONTROLLING APPARATUS

(75) Inventors: Shiro Uriu; Norio Suzuki; Noriko Samejima, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/626,699

(22) Filed: Apr. 2, 1996

(30) Foreign Application Priority Data

Sep. 6, 1995 (JP) .............................. 7-229511

(51) Int. Cl.$^7$ .............................................. H04L 12/56
(52) U.S. Cl. ....................................... 370/468; 370/468
(58) Field of Search ................... 370/399, 397, 370/395, 396, 398, 468, 465, 352, 353, 354, 355, 356, 229, 230, 231, 232, 233, 234, 235, 236, 237, 238, 252, 253, 412, 413, 414, 415, 416, 395.3, 395.43, 395.4, 391

(56) References Cited

U.S. PATENT DOCUMENTS

| | | | |
|---|---|---|---|
| 5,258,979 A | | 11/1993 | Oomuro et al. |
| 5,265,091 A | * | 11/1993 | van Landegem ............ 370/468 |
| 5,280,483 A | | 1/1994 | Kamoi et al. |
| 5,303,233 A | * | 4/1994 | Sugawara .................... 370/399 |
| 5,335,222 A | | 8/1994 | Kamoi et al. |
| 5,341,366 A | | 8/1994 | Souniya et al. |
| 5,361,251 A | | 11/1994 | Aihara et al. |
| 5,390,174 A | * | 2/1995 | Jugel .......................... 370/399 |
| 5,392,280 A | * | 2/1995 | Zheng ......................... 370/231 |
| 5,394,396 A | * | 2/1995 | Yoshigawa et al. ......... 370/399 |
| 5,432,713 A | | 7/1995 | Takeo et al. |
| 5,463,620 A | * | 10/1995 | Ciram ......................... 370/468 |
| 5,467,348 A | * | 11/1995 | Fujii et al. .................. 370/399 |
| 5,493,566 A | * | 2/1996 | Ljungberg et al. .......... 370/413 |
| 5,517,497 A | * | 5/1996 | Leboudec et al. ........... 370/399 |
| 5,548,589 A | * | 8/1996 | Jeon et al. ................... 370/399 |
| 5,555,265 A | | 9/1996 | Kakuma et al. |
| 5,572,518 A | * | 11/1996 | Takama et al. .............. 370/468 |
| 5,577,035 A | * | 11/1996 | Hayter et al. ............... 370/468 |
| 5,581,544 A | | 12/1996 | Hamada et al. |
| 5,583,857 A | | 12/1996 | Soumiya et al. |
| 5,594,717 A | | 1/1997 | Watanabe et al. |
| 5,600,645 A | * | 2/1997 | Boyer et al. ................ 370/468 |
| 5,623,492 A | * | 4/1997 | Terashinna .................. 370/468 |
| 5,691,975 A | | 11/1997 | Hamada et al. |
| 5,696,764 A | | 12/1997 | Soumiya et al. |
| 5,742,606 A | * | 4/1998 | Iliadis et al. ................ 370/413 |
| 5,936,958 A | | 8/1999 | Soumiya et al. |
| 5,966,381 A | * | 10/1999 | Buckley et al. ............. 370/468 |

OTHER PUBLICATIONS

Specificaton U.S. application Ser. No. 08/421,007 (Now abandoned.

* cited by examiner

Primary Examiner—Huy D. Vu
Assistant Examiner—Phuonghau Ba Nguyen
(74) Attorney, Agent, or Firm—Katten, Muchin, Zavis, Rosenman

(57) ABSTRACT

A service identification adding portion adds service identification information to a cell corresponding to each connection that uses a predetermined communication service (ABR service) and that is input to a switch system. A connection number counting portion counts the number of connections that use the communication service on each output line at predetermined intervals. A band control information generating portion generates band control information corresponding to each output line at predetermined intervals based on the number of connections counted at predetermined intervals. A band control information indicating portion sends band control information at predetermined intervals corresponding to each output line to a transmission side terminal corresponding to a connection that uses the communication service on each output line.

21 Claims, 8 Drawing Sheets

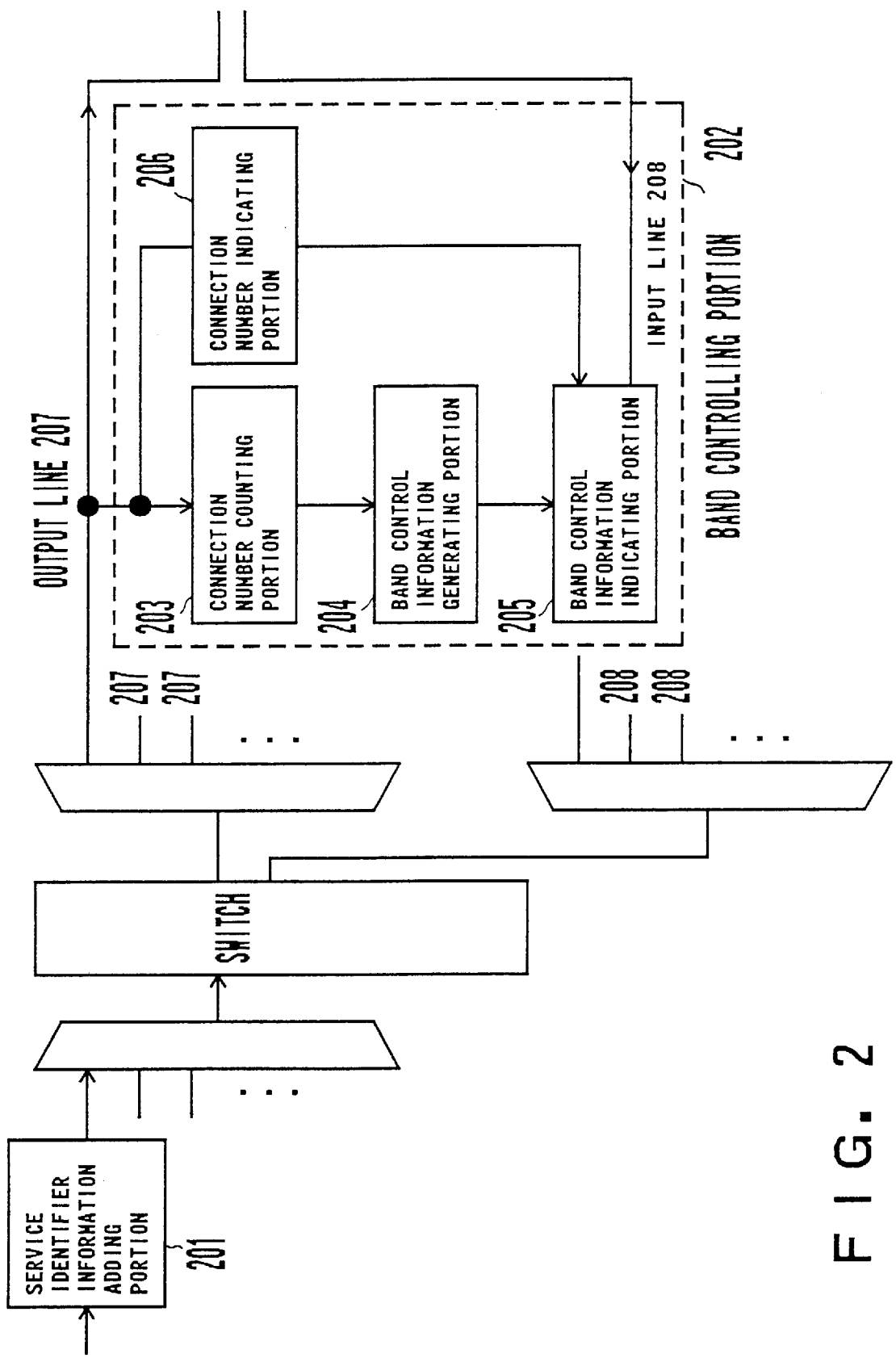
F I G. 2

INPUT VPI / VCI

| | OUTPUT SIDE VPI / VCI | TAG INFORMATION | ABR | ER |
|---|---|---|---|---|
| FFFFFFF | | | | |
| | ⋮ | ⋮ | ⋮ | |
| 0000000 | | | | |

ABR : ABR CALL IDENTIFIER
ER : ER VALUE CONTROL FLAG

FIG. 4

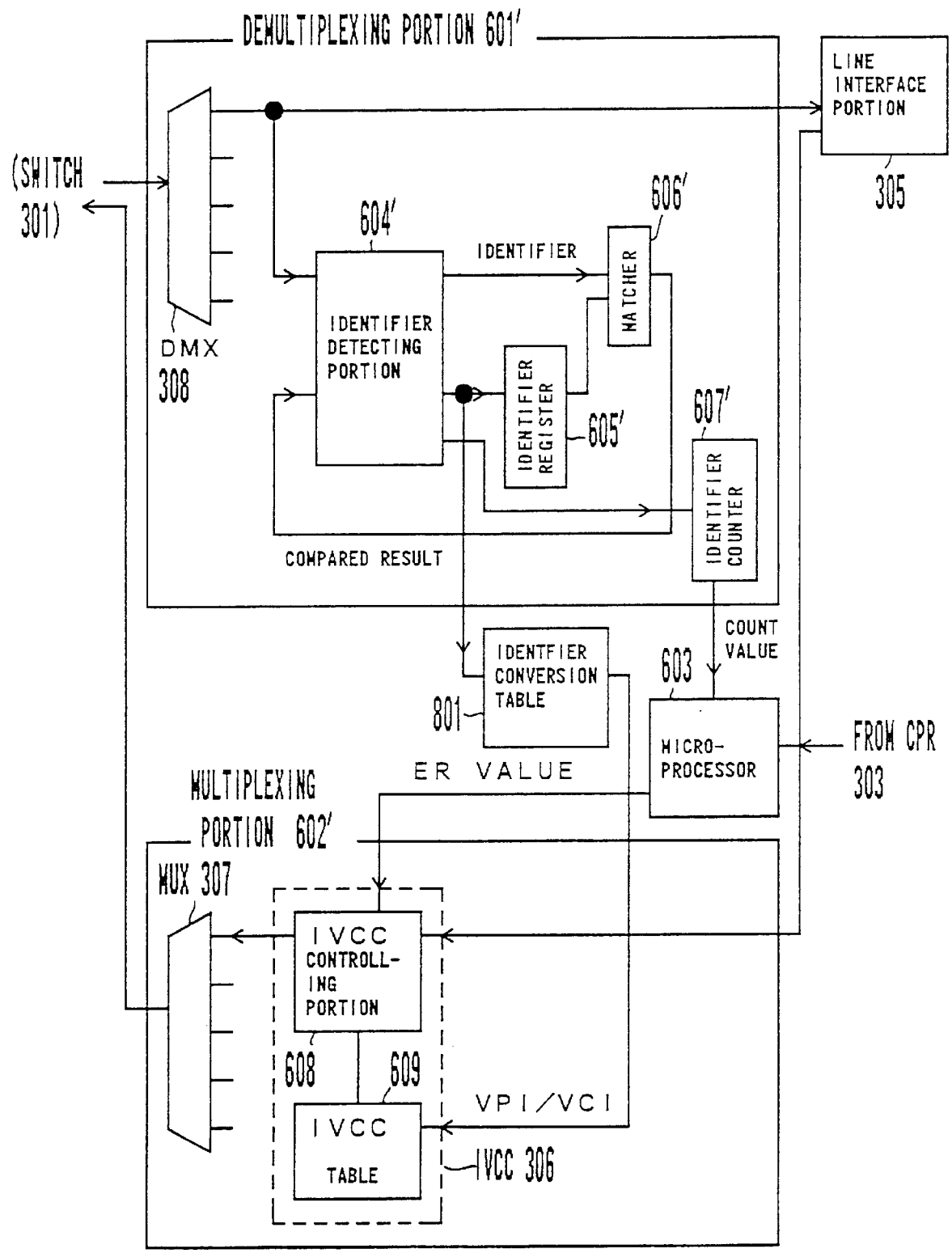
F I G. 8

BAND CONTROLLING APPARATUS

BACKGROUND OF THE INVENTION

1. Field of the Invention

The present invention relates to a band controlling technology for use with a communication service in which a plurality of connections share a link without a need to reserve bands.

2. Description of the Related Art

In an ATM (Asynchronous Transfer Mode) switch system, information is stored in fixed length cells and the resultant cells are transmitted. The cells are switched by a hardware switch at a high speed. Thus, in the ATM switch system, services for a variety of media such as sound data, image data, and text data, are integrally accommodated and processed. Thus, it is necessary to develop a technology for preventing bands for different services in the switch system from interfering with each other.

Services that are available at the present time are affected by the traffic characteristics thereof. Service qualities are defined corresponding to individual services. The service qualities are referred to as service classes or QOS (Quality Of Service). As one type of service class, an ABR (Available Bit Rate) service is defined.

In the ABR service, each connection transmits data without the need to reserve a band. A plurality of connections are controlled so that the band of a link is impartially used, the link is not exclusively used by a particular connection, and the cells are not improperly discarded. In other words, when there is only one connection that uses a link, the connection can use all the band of the link. However, when many connections use the link, the transmission rates of the individual connections are automatically lowered.

A real example of a related art reference for accomplishing the band control for the ABR service is shown in FIG. 1. In FIG. 1, a switch 101 and a line demultiplexing portion (DMX) 102 monitor the number of cells stored in a buffer thereof so as to determine whether or not a congestion takes place. When the switch 101 or the DMX 102 detects an occurrence of the congestion, an EFCI (Explicit Forward Congestion Indication) bit in a PT (Payload Type) field of a header of a subscriber cell that passes through a point in which the congestion takes place, is set. The resultant subscriber cell is transmitted to a reception side terminal 103. When the reception side terminal 103 receives a subscriber cell in which the EFCI bit has been set, it sets an explicit backward congestion indication bit (that represents that a congestion takes place) to a control cell that is termed a resource management cell (RM cell) and sends back the RM cell to a transmission side terminal 104. The RM cell is a cell in which the value of the PT field of the header of the RM cell is 110. The transmission side terminal 104 sends the RM cell to the reception side terminal 103 at predetermined intervals. When the reception side terminal 103 receives the RM cell, it sends back the RM cell to the transmission side terminal 104. When the transmission side terminal 104 receives the RM cell in which the explicit backward congestion indication bit has been set, the transmission side terminal 104 automatically decreases the transmission rate of subscriber cells corresponding to a predetermined algorithm. On the other hand, when the explicit backward congestion indication bit is not set, the transmission side terminal 104 automatically increases the transmission rate of the subscriber cells corresponding to a predetermined algorithm.

However, in the above-described end-to-end (reception side terminal to transmission side terminal) band controlling technology using the EFCI bit, it takes a long time to start the transmission rate control after a congestion takes place, due to delays of cells on the transmission lines and delays of processes performed in individual terminals. Thus, cells may be adversely discarded.

SUMMARY OF THE INVENTION

The present invention is made from the above-described point of view. An object of the preset invention is to accomplish a proper band control that is not performed by an end-to-end communication and also a band control that can be quickly performed.

The present invention is a band controlling apparatus for use with a communication service having connections for sharing a link without a band reservation and for communicating a fixed length cell including routing information necessary for autonomously switching each connection in a switch system and connection identification information for identifying each connection, comprising a service identification information adding portion for adding service identification information that represents that each connection uses the communication service, to a cell that is input to the switch system and that corresponds to each connection that uses the communication service, and a band controlling portion disposed in the switch system that is adapted for identifying a cell of which the service identification information has been added, so as to control a band of each connection that uses the communication service.

According to the structure of the present invention, a switch system itself can quickly send band control information with respect to a communication service such as an ABR service to a transmission side terminal.

Thus, a band control that is not performed by an end-to-end communication and that has a high accuracy can be accomplished. In addition, the communication quality of the above-described communication services can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 2 is a block diagram showing the theory of the present invention;

FIG. 4 is a schematic diagram showing a structure of an IVCC table according to the preferred embodiment of the present invention;

FIG. 8 is a block diagram showing a detailed structure of the terminal interface unit 302 (No. 2).

DESCRIPTION OF PREFERRED EMBODIMENTS

Theoretical Description

FIG. 2 is a block diagram showing the theory of the present invention.

The present invention is a band controlling system for use with a communication service (ABR service) having connections for sharing a link without a band reservation and for communicating a fixed length cell (ATM cell) including routing information (tag information) necessary for autonomously switching each connection in a switch system and connection identification information for identifying each connection. The connection identification information is, for example, a combination of a virtual path identifier (VPI) and a virtual channel identifier (VCI). Alternatively, the connection identification information is data that is derived from a combination of a virtual path identifier and a virtual channel identifier.

In FIG. 2, a service identification information adding portion 201 adds service identification information (ABR call identifier) that represents that a connection uses a communication service to a cell that is sent to a switch system and that corresponds to each connection that uses a communication service.

A band controlling portion 202 is disposed in the switch system. The band controlling portion 202 identifies a cell in which the service identification information has been added so as to control the band of each connection that uses the communication service.

Figure 6:
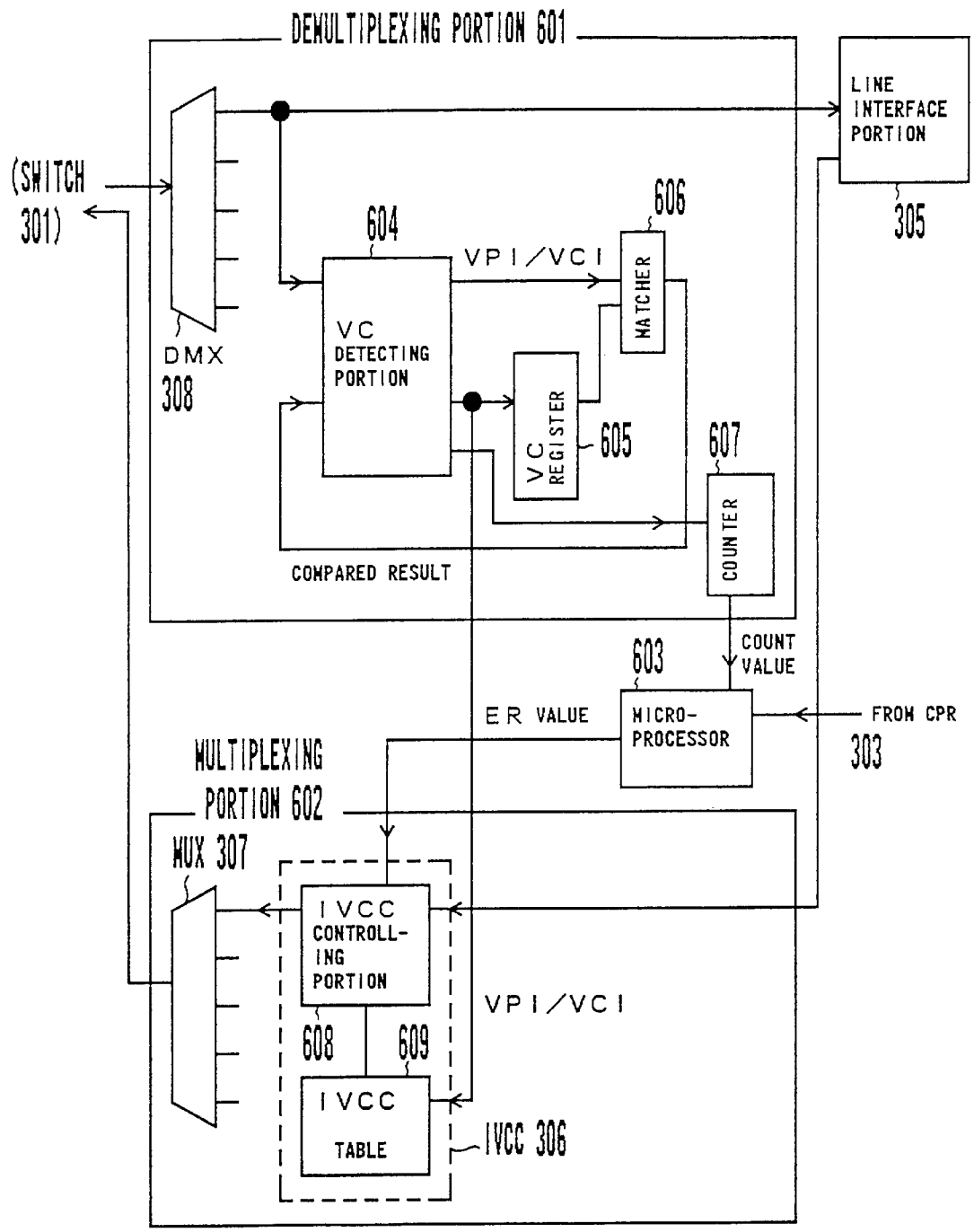
FIG. 6 is a block diagram showing a detailed structure of a terminal interface unit 302 (No. 1)

The band controlling portion 202 is composed of, for example, a connection number counting portion 203, a band control information generating portion 204, and a band control information indicating portion 205. Next, these structures will be described. The connection number counting portion 203 (composed of a VC detecting portion 604, a VC register 605, a matcher 606, and a VC counter 607 as shown in FIG. 6) identifies for each of output lines 207, with respect to the communication service connected to the switch system, the service identification information and connection identification information in a cell that is sent to each output line 207 so as to count the number of connections that use the communication service on each output line 207 at predetermined intervals. Thereafter, the band control information generating portion 204 (composed of a microprocessor 603) generates band control information at predetermined intervals corresponding to each output line 207, based on the number of connections counted by the connection number counting portion 203 at predetermined intervals corresponding to each output line 207. In reality, the band control information generating portion 204 divides a total band value assigned to the communication service on each output line 207 by the number of connections counted by the connection number counting portion 203 corresponding to each output line 207, and outputs the divided result as band control information. The band control information indicating portion 205 sends the band control information generated by the band control information generating portion 204 at predetermined intervals corresponding to each output line 207, to a transmission side terminal corresponding to a connection that uses the communication service on each output line 207.

When the configuration using the band controlling portion 203 is used, the transmission side terminal controls the bands of connections that use the communication service corresponding to the received band control information.

The band controlling portion 202 may also have a connection number indicating portion 206 that has the following construction. In this case, the connection number indicating portion 206 is composed of a VC detecting portion 604, a VC register 605, a matcher 606, and a VC counter 607. The connection indicating portion 202 identifies service identification information and connection identification information in a cell that is sent to each output line 207 for each of output lines 207 with respect to the communication service in the switch system, so as to identify connections that use the communication service on each output line 207 at predetermined intervals. Thereafter, the connection number indicating portion 206 informs the band control information indicating portion 205 of the identified connections. In this construction, the band control information indicating portion 205 stores band control information at predetermined intervals to a predetermined cell (resource management cell) that is input from each input line 208 for each of input of lines 208 in the reverse direction of, and corresponding to, each output line 207, and to which connection identification information corresponding to a connection informed by the connection number indicating portion 206 has been set, so as to send the band control information at predetermined intervals corresponding to each output line 207 to a transmission side terminal corresponding to a connection that uses the communication service on each output line 207.

In the above-described construction, the switch system itself can quickly send band control information with respect to a communication service, such as an ABR service, to a transmission side terminal. Thus, a band control that is not performed by an end-to-end communication and that has a high accuracy can be accomplished. Consequently, the communication quality of the above-described communication service can be improved.

Description of Preferred Embodiments

Next, preferred embodiments of the present invention will be described.

In the ABR service, data transmissions performed by applications of data communication systems are being used. Thus, transmission data of subscribers is not always sent with a predetermined band. In other words, the transmission of data may be occasionally stopped or data may be sent in a burst manner. In other words, even if 10 connections use an ABR service for a call in a network, the number of connections that actually use the ABR service at a particular time may only be three. In this case, if the band for 10 connections is used, the resources of the switch system are wasted. On the other hand, when 10 connections send data in a burst manner at the same time, an overload situation takes place in the network. A line output portion in which an ATM cell is branched from a high speed line side to a low speed line side is most heavily loaded in the switch system. Thus, it is important to prevent the occurrence of an overload situation in such a portion.

Thus, in the preferred embodiment that will be described in the following, the number of connections that are active and that use the ABR service is counted at an output line portion in the switch system at predetermined intervals. Next, in the switch system, a band value of which a total band value assigned by the network to the ABR service on the output line is divided by the counted value is set to an RM cell (as an explicit rate (ER) value) that is sent to a transmission side terminal. The RM cell is sent to the transmission side terminal. When the transmission side terminal receives the RM cell of which the ER value has been set, the transmission side terminal controls the transmission rate so that it corresponds to the ER value.

Figure 1:
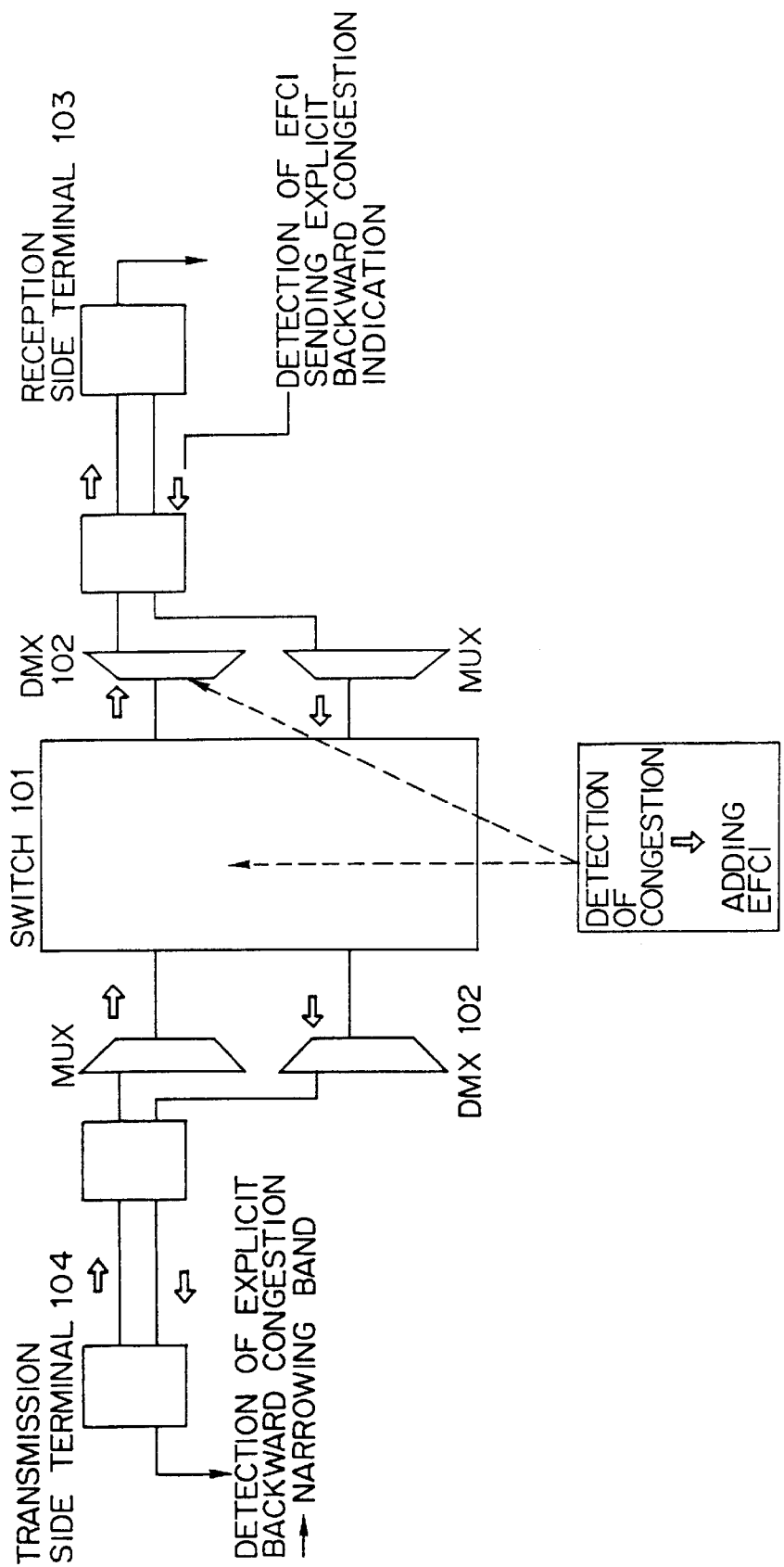
FIG. 1 is a block diagram showing an outlined structure of a band controlling system using an EFCI.
Figure 3:
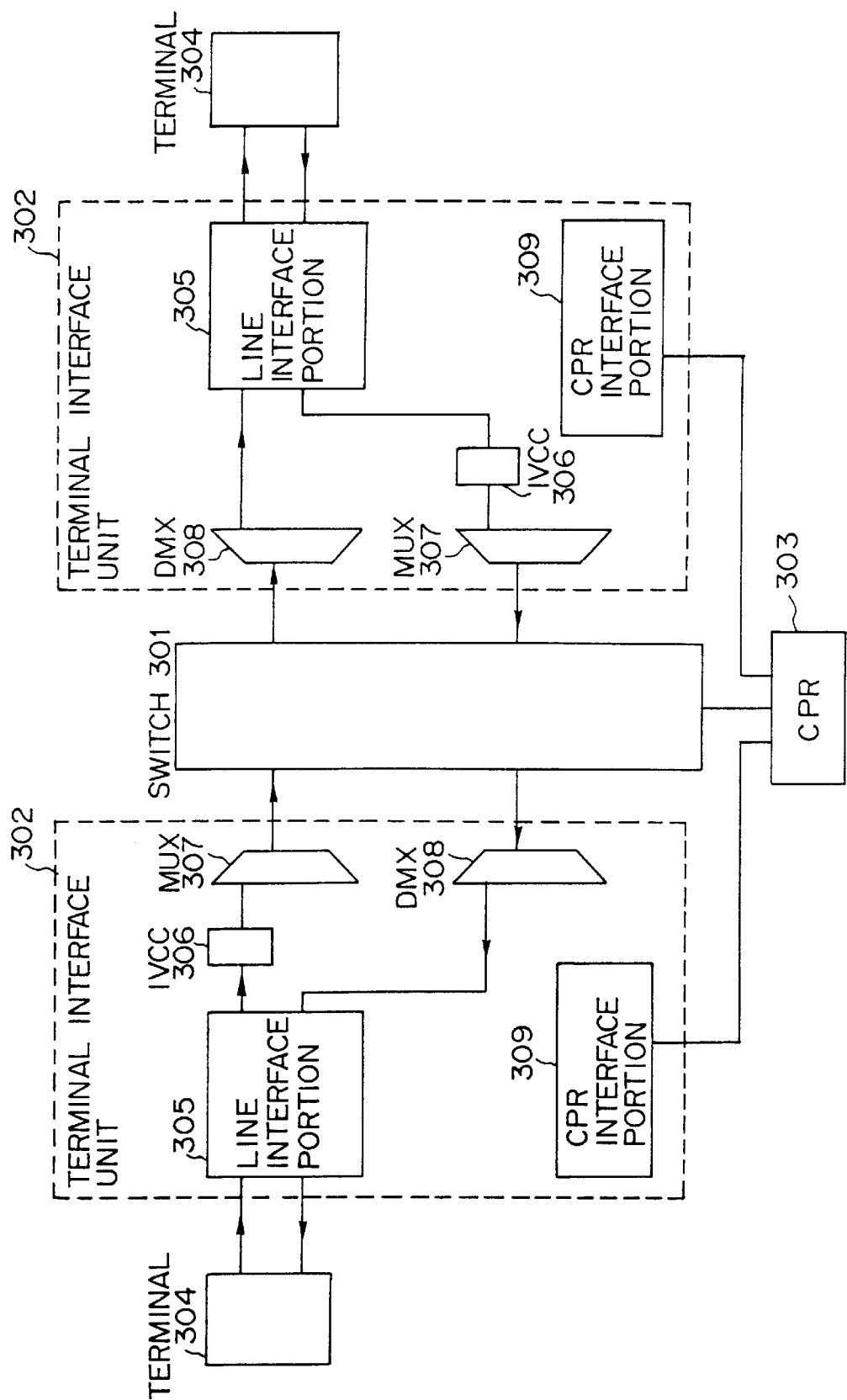
FIG. 3 is a block diagram showing a structure of a switch system according to a preferred embodiment of the present invention.

FIG. 3 is a block diagram showing a configuration of a switch system according to the preferred embodiment of the present invention. The switch system according to the preferred embodiment is an ATM switch system.

A terminal 304 is accommodated in a switch 301 through a terminal interface unit 302. The entire switch system is controlled by a central processor (CPR) 303.

The terminal interface unit 302 includes a line interface portion 305, an IVCC (Input Virtual Channel Converter) 306, an MUX (multiplexing unit) 307, a DMX (demultiplexing unit) 308, and a CPR interface portion 309. The line interface portion 305 terminates a line connected to the terminal 304. The IVCC 306 rewrites a header portion of an ATM cell received from a line through the line interface portion 305. The MUX 307 multiplexes cells received from each line interface portion 305 on each line and outputs the multiplexed cells to a highway connected to an input side of the switch 301. The DMX 308 demultiplexes cells on the highway connected to an output side of the switch 301 and outputs the demultiplexed cells to the line interface portion 305 connected to each line. The CPR interface portion 309 controls communications made between each portion of the terminal interface unit 302 and the CPR 303.

When a terminal (a transmission side terminal) 304 connected to a particular input line sends an ABR service call to a terminal (a reception side terminal) 304 connected to a particular output line, the CPR 303 determines whether or not the call is a call that uses the ABR service. When the call uses the ABR service, the CPR 303 calculates a band necessary for connections that the call uses, and selects a switching route.

Thereafter, information necessary for an IVCC table in the IVCC 306 corresponding to the input line is set. FIG. 4 is a schematic diagram showing a construction of the IVCC table. Each address of the IVCC table accords with VPI/VCI (input VPI/VCI) added to an ATM cell that is input from the input line. VPI/VCI (output VPI/VCI) corresponding to an output line, tag information, ABR call identifier, and an ER value control flag, are set to each address of the IVCC table. The ABR call identifier is set when input VPI/VCI corresponding to an address accords with a connection that uses the ABR service. The detail of the ER value controlling flag will be described later.

Figure 5:
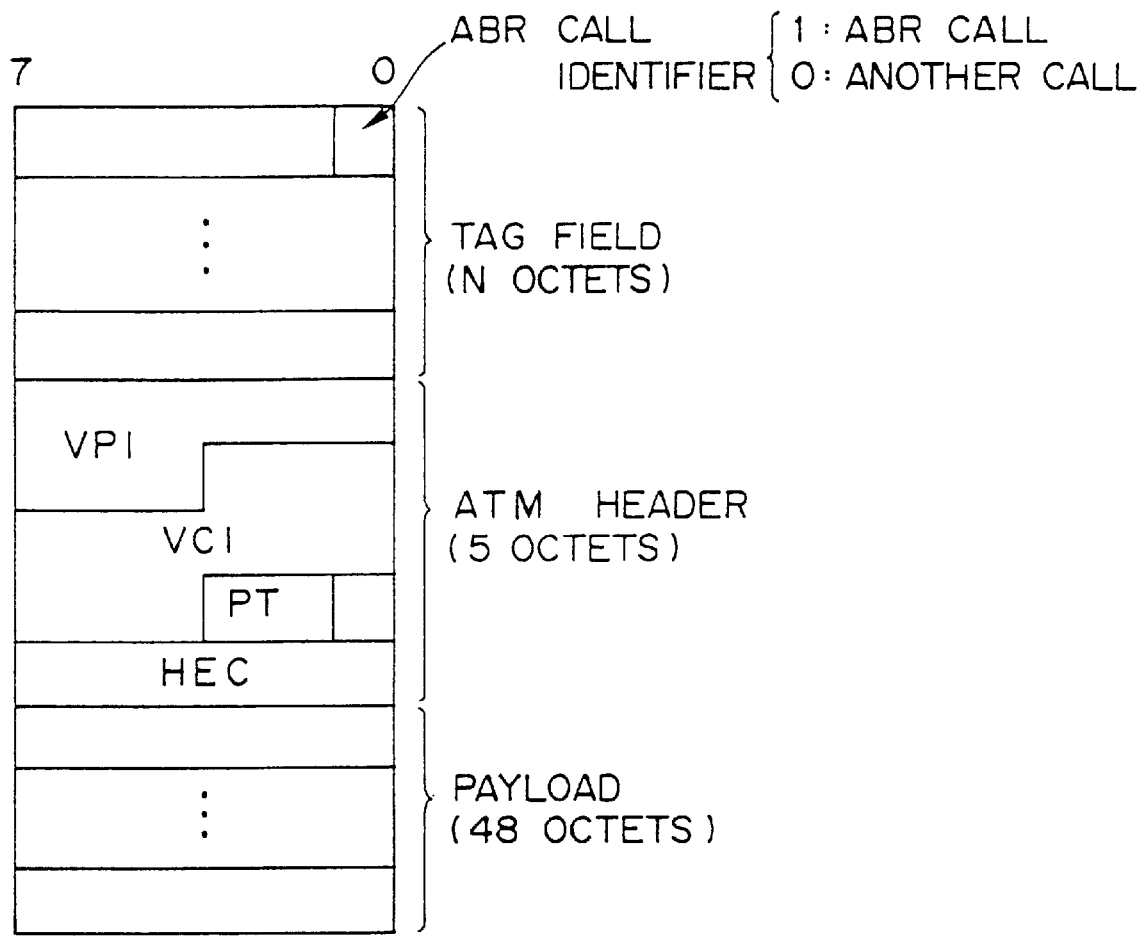
FIG. 5 is a schematic diagram showing a format of a subscriber cell according to the preferred embodiment of the present invention.

In a communication state, the IVCC 306 rewrites input VPI/VCI in the header portion of an ATM cell that is input from an input line through the line interface portion 305 with output VPI/VCI that are set at an address of the IVCC table, and adds tag information that is set at the address to the beginning of the input ATM cell. In addition, when the input ATM cell is a subscriber cell and the ABR call identifier is set to the address, an ABR call identifier with a value of "1" is added to the beginning of the input subscriber cell. FIG. 5 is a schematic diagram showing a format of a subscriber cell according to the preferred embodiment. As shown in FIG. 5, the ABR call identifier is set in a blank bit of the tag field in which the tag information is set. The ATM cell (subscriber cell) includes an ATM header of five octets and a payload portion of 48 octets. Data such as PT (payload type) and HEC (header error check) along with VPI/VCI are set to the ATM header. The PT is used to identifier a subscriber cell and an RM cell that will be described later. The HEC is data for detecting and correcting a data error of the ATM header. Communication data of the subscriber is stored in the payload portion.

The ATM cell that has been input from the IVCC 306 to the switch 301 through the MUX 307 is autonomously switched in the switch 301 corresponding to the tag information added at the beginning of the ATM cell. Thereafter, the resultant ATM cell is output from the DMX 308 in the terminal interface unit corresponding to a desired output line, to the line interface portion 305 corresponding to the desired output line.

FIG. 6 is a block diagram showing a detailed structure of the terminal interface unit 302 shown in FIG. 3. The terminal interface unit 302 is mainly composed of the line interface portion 305 shown in FIG. 3, a demultiplexing portion 601, a multiplexing portion 602, and a microprocessor 603.

A DMX 308 in the demultiplexing portion 601 outputs an ATM cell received from the switch 301 to an output portion connected to a line interface portion 305 corresponding to a desired output line, at a speed assigned to the desired output line corresponding to tag information added at the beginning of the ATM cell.

As a feature associated with the present invention, the demultiplexing portion 601 counts the number of connections for ABR calls from valid ATM cells that are output from each output portion.

In reality, a function block composed of a VC detecting portion 604, a VC register 605, a matcher 606, and a VC counter 607 is connected to each output portion of the DMX 308. In each output portion, when an ABR call identifier (see FIG. 5) with a value of "1" is added to the beginning of an ATM cell that is output to the output portion, the VC detecting portion 604 extracts VPI/VCI stored in the ATM header of the ATM cell (see FIG. 5). The VC detecting portion 604 outputs the extracted VPI/VCI to the matcher 606. In addition, the VC detecting portion 604 successively designates addresses to the VC register 605 so as to successively output the VPI/VCI stored at each address to the matcher 606. The matcher 606 compares VPI/VCI that are input from the VC detecting portion 604 with VPI/VCI that are successively output from the VC register 605, and outputs the compared results to the VC detecting portion 604. When the compared results represent that the extracted VPI/VCI is not stored at any address of the VC register 605, the VC detecting portion 604 writes the extracted VPI/VCI to a blank address at the end of the VC register 605. In addition, the VC detecting portion 604 increments the value of the VC counter 607 by 1. Moreover, whenever the VC detecting portion 604 writes extracted VPI/VCI to the VC register 605, the VC detecting portion 604 sends the VPI/VCI to an IVCC 306 disposed corresponding to an input line in the reverse direction of, and corresponding to, each output line in the multiplexing portion 602. Whenever the VC detecting portion 604 sends VPI/VCI to the IVCC table 609 in the IVCC 306, the IVCC 306 sets the ER value control flag (see FIG. 4) to an address corresponding to the VPI/VCI.

The microprocessor 603 reads the count value of each VC counter 607 corresponding to each output portion at predetermined intervals and then clears the count value of each VC counter 607. Thus, at each output portion of the DMX 308 of the demultiplexing portion 601, the number of connections for ABR calls that are active are counted at predetermined intervals as VPI/VCI numbers of ABR calls.

Whenever each counter value is read from each VC counter 607 corresponding to each output portion at predetermined intervals, the microprocessor 603 divides a total band value of ABR calls (sent from the CPR 303 through the CPR interface portion 309 shown in FIG. 3) on each output line corresponding to each output portion by each count value, and obtains an ER value as each band value. Thereafter, the microprocessor 603 sends each ER value to each IVCC 306 disposed corresponding to each input circuit in the reverse direction of, and corresponding to, each output circuit in the multiplexing portion 602.

The IVCC controlling portion 608 in the IVCC 306 rewrites input VPI/VCI added at the header portion of an ATM cell that is received from an input line through the line interface portion 305 with output VPI/VCI set at an address corresponding to the input VPI/VCI in the IVCC table 609. In addition, the IVCC controlling portion 608 adds tag information set at the address to the beginning of the input ATM cell.

Figure 7:
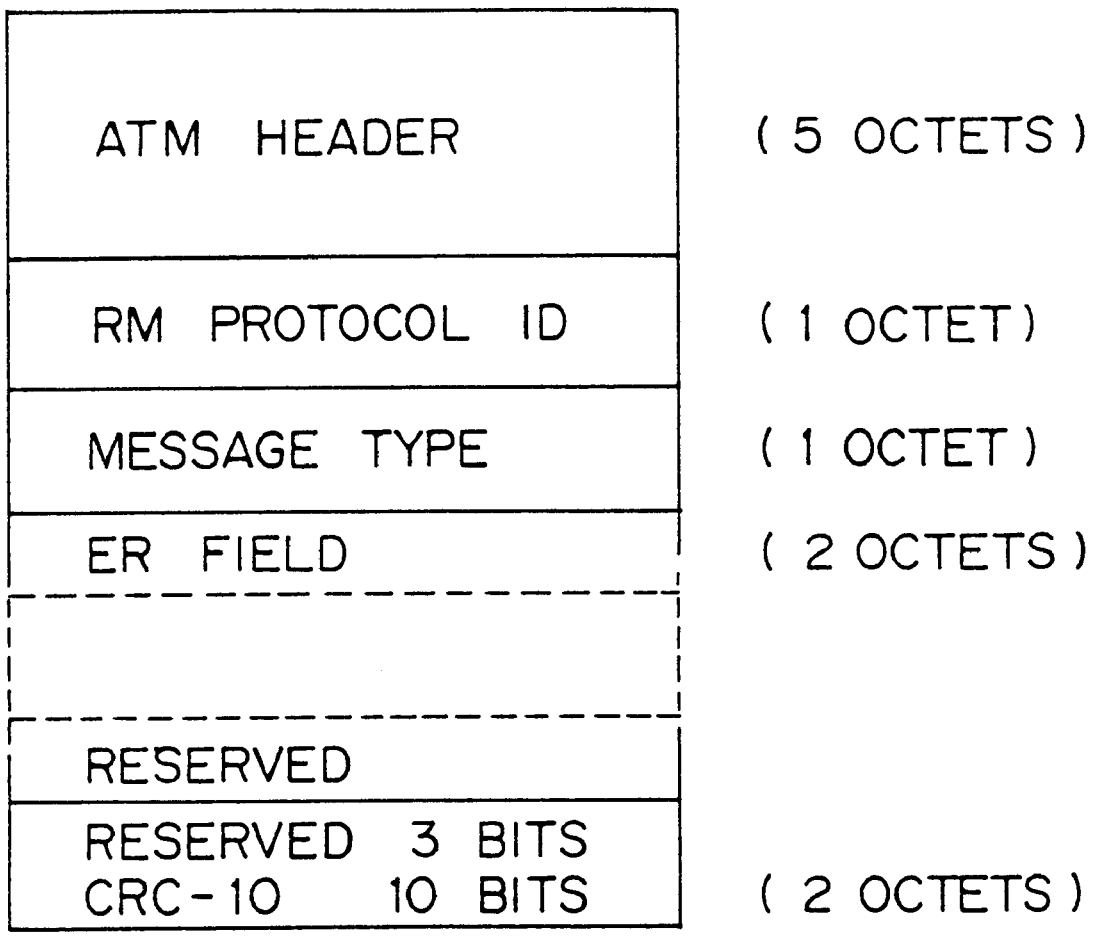
FIG. 7 is a schematic diagram showing a format of an RM cell according to the preferred embodiment of the present invention.

The transmission side terminal 304 sends an RM cell of which the value of the PT field in the ATM header is "110" to the a reception side terminal 304 at predetermined intervals. When the reception side terminal 304 receives the RM cell, it sends it back to the transmission side terminal 304. The IVCC controlling portion 608 identifies the PT field of the input ATM cell so as to determine whether or not an RM cell has been input. When the RM cell has been input, the IVCC controlling portion 608 identifies whether or not the ER value control flag has been set to an address corresponding to the VPI/VCI added to the RM cell in the IVCC table 609. When the ER value control flag has been set, the IVCC controlling portion 608 stores the ER value (as explicit rate information) received from the microprocessor 603 at that time to the RM cell and sends the RM cell to the switch 301. FIG. 7 is a schematic diagram showing a format of an RM cell. The ER value is stored in an ER field.

The RM cell is sent to a transmission side terminal 304. When the transmission side terminal 304 receives an RM cell in which an ER value has been set, the transmission side terminal 304 controls the transmission rate so that it accords with the ER value.

In the above-described preferred embodiment, the switch system itself (the demultiplexing portion 601 and the microprocessor 603 in the terminal interface unit 302) counts the number of connections of ABR calls for each output line (VPI number/VCI number) and stores the ER value of which the total band value assigned to the ABR service on each output line is divided by the counted value, to an RM cell that is sent to a transmission side terminal 304.

Thus, the ER value sent to the transmission side terminal 304 is not affected by an end-to-end communication. Consequently, the ER value can be quickly sent.

FIG. 8 is a block diagram showing another structure of the terminal interface unit 302 shown in FIG. 3. In FIG. 8, similar portions to those in FIG. 6 have similar functions and are denoted by similar reference numerals.

The difference between the structure shown in FIG. 8 and the structure shown in FIG. 6 is in that the function for processing VPI/VCI is substituted with a function for processing another identifier. Depending on the structure of a switch system, VPI/VCI of an ATM cell to be transferred may be rewritten to another identifier in which the VPI/VCI are derived (namely, the number of bits required for the data is reduced). Generally, since the number of bits of VPI/VCI is large, such a converting process is executed for alleviating the load of the switch process. FIG. 8 shows the structure used in such a case.

In FIG. 8, dashed portions with the same reference numerals as those shown in FIG. 6 function in the same manner as those in FIG. 6, except that data to be processed are changed from VPI/VCI to another identifier. However, whenever an identifier detecting portion 604' writes an extracted identifier to an identifier register 605', it temporarily outputs the identifier to a identifier conversion table 801. The identifier conversion table 801 converts the input identifier to relevant VPI/VCI and sends the VPI/VCI to the IVCC 306 disposed corresponding to an input line in the reverse direction of, and corresponding to, each output line.

Whenever VPI/VCI are received from the VC detecting portion 604', the ER value control flag (see FIG. 5) is set to an address corresponding to the VPI/VCI on the IVCC table 609 in the IVCC 306. Only this function is different from the structure shown in FIG. 8.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A band controlling apparatus for use with a communication service having connections for sharing a link without a band reservation and for communicating a fixed length cell including routing information for autonomously switching the cell and connection identification information for identifying each connection, comprising:

a service identification information inserter, to add service identification information representing the communication service having connection for sharing a link without a band reservation to a received cell for the connection on which the communication service is used; and a band controller to control a band of each connection that uses the communication service, by identifying the cell which the service identification information has been added to, wherein said band controller comprises:

a connection number counter to identifying the service identification information and the connection identification information added to the cell that is output to each output line for each output line with respect to the communication service in the switch system so as to count the number of connections that use the communication service on each output line at predetermined intervals;

a band control information generator to generate band control information at predetermined intervals corresponding to each output line based on the number of connections counted by said connection number counter at predetermined intervals corresponding to each output line; and a band control information indicator to send band control information generated by said band control information generator at predetermined intervals corresponding to each output line to a transmission side terminal corresponding to a connection that uses the communication service on each output line, wherein the transmission side terminal is adapted for controlling a band of a connection that uses the communication service with respect to the terminal corresponding to the band control information received by the terminal.

2. The apparatus as set forth in claim 1, wherein said band control information generator is adapted for dividing a total band value assigned to the communication service on each output line by the number of connections counted by said connection number counter corresponding to each output line and outputting the divided result as the band control information.

3. The apparatus as set forth in claim 1, wherein said band controller further comprises:

a connection indicator to identify the service identification information and the connection identification information added to a cell that is output to each output line for each output line with respect to the communication service in the switch system so as to identify a connection that uses the communication service on each output line at predetermined intervals and to inform said band control information indicator of the identified connection, and wherein said band control information indicator is adapted for storing band control information at predetermined intervals to a predetermined cell with connection identification information corresponding to a connection received from each input circuit and informed by said connection indicator for each input line in the opposite direction of and corresponding to each output line so as to send band control information at predetermined intervals corresponding to each output line to a transmission side terminal corresponding to a connection that uses the communication terminal on each output line.

4. The apparatus as set forth in claim 3,
wherein the predetermined cell to which the band control information is stored by said band control information indicator is a resource management cell.

5. A band controlling apparatus for use with a communication service having connections for sharing a link without a band reservation and for communicating a fixed length cell including routing information for autonomously switching the cell and a combination of a virtual path identifier and a virtual channel identifier for identifying each connection, comprising:

a service identification information inserter, to add service identification information representing the communication service having connection for sharing a link without a band reservation to a received cell for the connection on which the communication service is used; and a band controller to control a band of each connection that uses the communication service, by identifying the cell which the service identification information has been added to wherein said band controller comprises:

a connection number counter to identifying the service identification information and the connection identification information added to the cell that is output to each output line for each output line with respect to the communication service in the switch system so as to count the number of connections that use the communication service on each output line at predetermined intervals;

a band control information generator to generate band control information at predetermined intervals corresponding to each output line based on the number of connections counted by said connection number counter at predetermined intervals corresponding to each output line; and a band control information indicator to send band control information generated by said band control information generator at predetermined intervals corresponding to each output line to a transmission side terminal corresponding to a connection that uses the communication service on each output line, wherein the transmission side terminal is adapted for controlling a band of a connection that uses the communication service with respect to the terminal corresponding to the band control information received by the terminal.

6. A band controlling apparatus for use with a communication service having connections for sharing a link without a band reservation and for communicating a fixed length cell including routing information for autonomously switching the cell and data obtained by degenerating a combination of a virtual path identifier and a virtual channel identifier for identifying each connection, comprising:

a service identification information inserter, to add service identification information representing the communication service having connection for sharing a link without a band reservation to a received cell for the connection on which the communication service is used; and a band controller to control a band of each connection that uses the communication service, by identifying the cell which the service identification information has been added to a wherein said band controller comprises:

a connection number counter to identifying the service identification information and the connection identification information added to the cell that is output to each output line for each output line with respect to the communication service in the switch system so as to count the number of connections that use the communication service on each output line at predetermined intervals;

a band control information generator to generate band control information at predetermined intervals corresponding to each output line based on the number of connections counted by said connection number counter at predetermined intervals corresponding to each output line; and a band control information indicator to send band control information generated by said band control information generator at predetermined intervals corresponding to each output line to a transmission side terminal corresponding to a connection that uses the communication service on each output line, wherein the transmission side terminal is adapted for controlling a band of a connection that uses the communication service with respect to the terminal corresponding to the band control information received by the terminal.

7. A band controlling method for use with a communication service having connections for sharing a link without a band reservation and for communicating a fixed length cell including routing information for autonomously switching the cell and connection identification information for identifying each connection, comprising the steps of:

adding service identification information representing the communication service having connection for sharing a link without a band reservation to a received cell for the connection on which the communication service is used; and controlling a band of each connection that uses the communication service, by identifying the cell which the service identification information has been added to, wherein the step of controlling a band, further comprising the steps of:

counting the number of connections that use the communication service on each output line at predetermined intervals, by identifying the service identification information and the connection identification information added to the cell output to each output line for each output line with respect to the communication service in the switch system;

generating band control information at predetermined intervals corresponding to each output line, based on a counted number of connections at predetermined intervals corresponding to each output line; and informing a transmission side terminal corresponding to a connection that uses the communication service on each output line, of the generated band control information at predetermined intervals corresponding to each output line, the transmission side terminal controlling the band of the connection that uses the communication service with respect to the terminal.

8. The method as set forth in claim 7, wherein the band control information is output as a result of dividing an entire band value assigned for the communication service on each output line by the counted number of connections corresponding to each output line.

9. The method as set forth in claim 7, wherein the step of controlling a band further comprises the steps of:

identifying the connection that uses the communication service at predetermined intervals on each output line, by identifying the service identification information and the connection identification information added to the cell output to each output line for each output line with respect to the communication service in the switch system; and informing the band control information at predetermined intervals corresponding to each output line of the transmission side terminal corresponding to the connection that uses the communication service on each output line, by storing the band control information at predetermined intervals corresponding to each output line, in a predetermined cell to which the connection identification information corresponding to an identified connection input from each input line, for each input line corresponding to each output line, whose direction is reverse to that of the output line.

10. The method as set forth in claim 9, wherein the predetermined cell where the band control information is stored when informing the band control information is a resource management cell.

11. A band controlling method for use with a communication service having connections for sharing a link without a band reservation and for communicating a fixed length cell including routing information for autonomously switching the cell and a combination of a virtual path identifier and a virtual channel identifier for identifying each connection, comprising the steps of:

adding service identification information representing the communication service having connection for sharing a link without a band reservation to a received cell for the connection on which the communication service is used; and controlling a band of each connection that uses the communication service, by identifying the cell which the service identification information has been added to, wherein the step of controlling a band, further comprising the steps of:

counting the number of connections that use the communication service on each output line at predetermined intervals, by identifying the service identification information and the connection identification information added to the cell output to each output line for each output line with respect to the communication service in the switch system;

generating band control information at predetermined intervals corresponding to each output line, based on a counted number of connections at predetermined intervals corresponding to each output line; and informing a transmission side terminal corresponding to a connection that uses the communication service on each output line, of the generated band control information at predetermined intervals corresponding to each output line, the transmission side terminal controlling the band of the connection that uses the communication service with respect to the terminal.

12. A band controlling method for use with a communication service having connections for sharing a link without a band reservation and for communicating a fixed length cell including routing information for autonomously switching the cell and data obtained by degenerating a combination of a virtual path identifier and a virtual channel identifier for identifying each connection, comprising the steps of:

adding service identification information representing the communication service having connection for sharing a link without a band reservation to a received cell for the connection on which the communication service is used; and controlling a band of each connection that uses the communication service, by identifying the cell which the service identification information has been added to, wherein the step of controlling a band, further comprising the steps of:

counting the number of connections that use the communication service on each output line at predetermined intervals, by identifying the service identification information and the connection identification information added to the cell output to each output line for each output line with respect to the communication service in the switch system;

generating band control information at predetermined intervals corresponding to each output line, based on a counted number of connections at predetermined intervals corresponding to each output line; and informing a transmission side terminal corresponding to a connection that uses the communication service on each output line, of the generated band control information at predetermined intervals corresponding to each output line, the transmission side terminal controlling the band of the connection that uses the communication service with respect to the terminal.

13. A switching system, in which a transmission side terminal accommodates a connection of a communication service whose communication band can be changed based on band information included in a cell transmitted from a reception side terminal, and the cell includes a connection identifier for identifying a connection, for switching to a desired output line, comprising:

means for identifying the connection of a cell proceeding from the transmission side terminal to the reception side terminal, and calculating the band information of each connection which uses the desired output line; and means for setting the band information calculated by said calculating means in the cell proceeding from the reception side terminal to the transmission side terminal, wherein the band information calculated by said calculating means is an ER (Explicit Rate) value obtained from a total band value assigned to the output line as the communication service, and the number of connections which use the output line.

14. A switching method, with which a transmission side terminal accommodates a connection of a communication service whose communication band can be changed based on band information included in a cell transmitted from a reception side terminal, and the cell includes a connection identifier for identifying a connection, for switching to a desired output line, comprising the steps of:

identifying the connection of a cell proceeding from the transmission side terminal to the reception side terminal, and calculating the band information of each connection which used the desired output line; and setting the band information in the cell proceeding from the reception side terminal to the transmission side terminal, wherein the band information is an ER (Explicit Rate) value obtained from a total band value assigned to the output line as the communication service, and the number of connections which use the output line.

15. A switching system for providing a communication service where control information included in a cell is transmitted from a reception side terminal, comprising:

calculating means for calculating band information used as a communication band in the transmission side terminal under a communication after a call is established; and setting means for setting the band information calculated by said calculating means as the control information in the cell transmitted from the reception side terminal to the transmission side terminal under a communication after a call is established, wherein the transmission side terminal changes the communication band based on the band information in the cell.

16. A switching system for providing a communication service where control information included in a cell is transmitted from a reception side terminal, comprising:

a calculating unit calculating band information used as a communication band in a transmission side terminal under a communication after a call is established; and a setting unit setting the band information calculated by said calculating unit as the control information in the cell transmitted from the reception side terminal to the transmission side terminal under a communication after a call is established, wherein the transmission side terminal changes the communication band based on the band information in the cell.

wherein the band information calculated by said calculating unit is an ER (Explicit Rate) value obtained from a total band value assigned as the communication service and a number of used connections.

17. The system as set forth in claim 15, wherein said setting means sets the band information in a RM (Resource Management) cell which is transmitted by the transmission side terminal and is sent back by the reception side terminal.

18. A switching method for providing a communication service where control information included in a cell is transmitted from a reception side terminal, comprising the steps of:

calculating band information used as a communication band in the transmission side terminal under a communication after a call is established;

setting said calculated band information as the control information in the cell transmitted from the reception side terminal to the transmission side terminal under a communication after a call is established; and changing the communication band in the transmission side terminal based on the band information in the cell.

19. A switching method for providing a communication service where control information included in a cell is transmitted from a reception side terminal, comprising:

calculating band information used as a communication band in a transmission side terminal under a communication after a call is established; and setting said calculated band information as the control information in the cell transmitted from the reception side terminal to the transmission side terminal under a communication after a call is established; and wherein the calculated band information is an ER (Explicit Rate) value obtained from a total band value assigned as the communication service and a number of used connections.

20. The method as set forth in claim 18, wherein the calculated band information is set in an RM (Resource Management) cell which is transmitted by the transmission side terminal and is sent back by the reception side terminal.

21. A switching system for providing a communication service where control information included in a call is transmitted from a reception side terminal, comprising:

calculating means for calculating band information used as a communication band in a transmission side terminal based on a number of used connections under a communication after a call is established; and setting means for setting the band information calculated by said calculating means as the control information in the cell transmitted from the reception side terminal to the transmission side terminal under a communication after a call is established, wherein the transmission side terminal changes the communication band based on the band information in the cell.

* * * * *